US012668707B2

(12) United States Patent
Rosencrans et al.

(10) Patent No.: US 12,668,707 B2
(45) Date of Patent: Jun. 30, 2026

(54) ELECTROSTATIC DISSIPATIVE COATINGS

(71) Applicant: ICP CONSTRUCTION, INC., Andover, MA (US)

(72) Inventors: Alan M. Rosencrans, Phoenix, AZ (US); R. Brandon Atwood, Phoenix, AZ (US); Eric G. Perkins, Phoenix, AZ (US)

(73) Assignee: ICP CONSTRUCTION, INC., Andover, MA (US)

( * ) Notice: Subject to any disclaimer, the term of this patent is extended or adjusted under 35 U.S.C. 154(b) by 0 days.

(21) Appl. No.: 18/853,456

(22) PCT Filed: Apr. 8, 2022

(86) PCT No.: PCT/US2022/023997

§ 371 (c)(1),
(2) Date: Oct. 2, 2024

(87) PCT Pub. No.: WO2023/195992

PCT Pub. Date: Oct. 12, 2023

(65) Prior Publication Data

US 2025/0215242 A1 Jul. 3, 2025

(51) Int. Cl.

| | |
|---|---|
| ***C09D 5/24*** | (2006.01) |
| ***C08K 3/04*** | (2006.01) |
| ***C08L 63/00*** | (2006.01) |
| ***C09D 7/61*** | (2018.01) |
| ***C09D 7/65*** | (2018.01) |
| ***C09D 163/00*** | (2006.01) |
| ***H01B 1/24*** | (2006.01) |

(52) U.S. Cl.

CPC ................ *C09D 5/24* (2013.01); *C08K 3/041* (2017.05); *C08L 63/00* (2013.01); *C09D 7/61* (2018.01); *C09D 7/65* (2018.01); *C09D 163/00* (2013.01); *H01B 1/24* (2013.01)

(58) Field of Classification Search

CPC . H01B 1/00; H01B 1/24; C08K 3/041; C08K 5/415; C08K 5/541; C08K 2201/001; C08L 63/00; C08L 2203/20

See application file for complete search history.

(56) References Cited

U.S. PATENT DOCUMENTS

| | | | | |
|---|---|---|---|---|
| 2011/0218270 A1* | 9/2011 | Suter | C08G 59/5006 252/182.13 |
| 2016/0168030 A1 | 6/2016 | Teichert et al. | |
| 2018/0022647 A1 | 1/2018 | Teichert et al. | |
| 2018/0208801 A1 | 7/2018 | Robichaud et al. | |
| 2023/0103660 A1* | 4/2023 | Yadav | C01B 32/174 252/502 |
| 2023/0348690 A1* | 11/2023 | Sarioglu | C09D 7/70 |
| 2024/0254309 A1* | 8/2024 | Yadav | C08J 3/226 |

OTHER PUBLICATIONS

Kalia Polymer/POSS Nanocomposites and Hybrid Materials; Preparation, Properties, Applications, Springer Series on Polymer and Composite Materials, 2018, ISBN 978-3-030-02326-3 ISBN 978-3-030-02327-0 (pp. 395-413).*

English language machine translation of EP 3967720 A1 (pub Mar. 2022).*

English language machine translation of RU 2654759 C1 (pub May 2018).*

Gupta et al "Non-fluorinated hybrid composite membranes based on polyethylene glycol functionalized polyhedral oligomeric silsesquioxane [PPOSS] and sulfonated poly(ether ether ketone) [SPEEK] for fuel cell applications", Reactive & Functional Polymers 73 (2013) 1268-1280.*

Mishra et al. "Enhancing the mechanical properties of an epoxy resin using polyhedral oligomeric silsesquioxane (POSS) as nano-reinforcement" Polymer Testing, vol. 62 {Jul. 5, 2017): pp. 210-218.

"Why is There 20, 60 and 85 Degrees Gloss?" Color Application Specialist <http://colorapplications.com/why-is-there-20-60-and-85-degrees-gloss/> (Nov. 12, 2018): p. 1.

Arena et al. "Multifunctional Performance of a Nano-Modified Fiber Reinforced Composite Aeronautical Panel" Materials, vol. 12 (Mar. 15, 2019): pp. 1-19.

International Patent Application No. PCT/US2022/023997, International Search Report and Written Opinion mailed Jul. 13, 2022, 11 pages.

TiO2Basics for Paint Appearance and Performance Paint & Coatings Industry <https://www.pcimag.com/arlicles/83622-tio2basics-for-paint-appearance-and-performance> (Apr. 26, 2022): pp. 1-11.

* cited by examiner

*Primary Examiner* — Mark Kopec

(74) *Attorney, Agent, or Firm* — Fredrikson & Byron, P.A.

(57) ABSTRACT

The invention pertains generally to a composition which comprises: at least one two-part epoxy resin; Part A of the epoxy resin comprising at least one polyepoxide; and Part B of the epoxy resin comprising at least one amine hardener, at least one single-walled carbon nanotube; at least one polyhedral silsesquioxane; a coated composition of the two-part epoxy resin having a conductivity of a maximum of 1.0×109 ohms; and the coated composition having a gloss as measured by a reflected image quality of the coated composition is at least 50.

17 Claims, No Drawings

ELECTROSTATIC DISSIPATIVE COATINGS

CROSS-REFERENCE TO RELATED APPLICATIONS

This application is a 35 U.S.C. 371 national stage filing from International Application No. PCT/US2022/023997, filed Apr. 8, 2022, the contents of which is incorporated herein by reference in its entirety.

TECHNICAL FIELD

The invention described herein pertains generally to electrostatic dissipative ("ESD") of which flooring is one example. ESD flooring is created from a combination of materials, including carbon fibers that transfer the electrostatic charge from a person to the flooring. Thus, reducing the chance of someone creating a static discharge through physical contact. These floors come in several styles, including carpet, vinyl, and rubber.

BACKGROUND OF THE INVENTION

Polysiloxane coatings have been extensively used as protective coatings for articles made from synthetic resins in order to provide the relatively soft resin with a hard, abrasion-resistant surface. Curable coating compositions for applying such abrasion-resistant coatings are disclosed, for example, in U.S. Pat. Nos. 3,986,997 and 4,246,038. Such abrasion-resistant coatings are desirable and even necessary in applications such as coating of optically transparent materials such as plastic window glazing, protective screens for cathode ray tubes and screens for rear-projection television apparatus. For such articles, surface scratches are especially undesirable because the accumulation of such scratches causes the article to become hazy and thereby decreases the transparency of the window, viewing screen, or the like.

However, hard, abrasion-resistant coatings tend to have a very high surface resistivity, which makes them prone to accumulate static charge and very slow to dissipate that charge. The static charge on the surface tends to attract dust, which also causes a loss of clarity of the transparent article. In some cases the static charge may even interfere with the operation of electrical equipment positioned close to the charged surface, e.g., within a plastic cabinet that accumulates static surface charge.

Auxiliary anti-static coatings, sprayed onto the surface, have been used to alleviate the problem of retained static charge. However, such sprayed coatings are not permanent, but must be renewed from time to time.

SUMMARY OF THE INVENTION

The present invention is directed to a product and a process for static dissipation of electricity by using a composition comprising: at least one two-part epoxy resin; Part A of the epoxy resin comprising at least one polyepoxide; and Part B of the epoxy resin comprising at least one amine hardener; at least one single-walled carbon nanotube; at least one polyhedral silsesquioxane; the composition having a conductivity of a maximum of $1.0\times10^9$ ohms; and the composition having a gloss as measured by a reflected image quality of at least 50.

The invention is further described by the following Detailed Description and by a series of embodiments at the end of the Specification.

These and other objects of this invention will be evident when viewed in light of the detailed description and appended claims.

DETAILED DESCRIPTION OF THE INVENTION

The best mode for carrying out the invention will now be described for the purposes of illustrating the best mode known to the applicant at the time of the filing of this invention. The examples and figures are illustrative only and not meant to limit the invention, as measured by the scope and spirit of the claims.

Unless the context clearly indicates otherwise: the word "and" indicates the conjunctive; the word "or" indicates the disjunctive; when the article is phrased in the disjunctive, followed by the words "or both" or "combinations thereof" both the conjunctive and disjunctive are intended.

As used in this application, the term "approximately" is within 10% of the stated value, except where noted.

As used in this application, "epoxy resin" means a cured end product resultant from mixing a Part A and a Part B. Most of the commercially used epoxy monomers are produced by the reaction of a compound with acidic hydroxy groups and epichlorohydrin. First a hydroxy group reacts in a coupling reaction with epichlorohydrin, followed by dehydrohalogenation. Epoxy resins produced from such epoxy monomers are called glycidyl-based epoxy resins. The hydroxy group may be derived from aliphatic diols, polyols (polyether polyols), phenolic compounds or dicarboxylic acids. Phenols can be compounds such as bisphenol A and novolak. Polyols can be compounds such as 1,4-butanediol. Di- and polyols lead to diglycid polyethers. Dicarboxylic acids such as hexahydrophthalic acid are used for diglycide ester resins. Instead of a hydroxy group, also the nitrogen atom of an amine or amide can be reacted with epichlorohydrin.

The other production route for epoxy resins is the conversion of aliphatic or cycloaliphatic alkenes with peracids. In contrast to glycidyl-based epoxy resins, this production of such epoxy monomers does not require an acidic hydrogen atom but an aliphatic double bond.

One of the most common epoxy resins are based on reacting epichlorohydrin with bisphenol A, resulting in a different chemical substance known as bisphenol A diglycidyl ether. Bisphenol A-based resins are the most widely commercialized resins but also other bisphenols are analogously reacted with epichlorohydrin, for example Bisphenol F.

In this two-stage reaction, epichlorohydrin is first added to bisphenol A (bis(3-chloro-2-hydroxy-propoxy)bisphenol A is formed), then a bisepoxide is formed in a condensation reaction with a stoichiometric amount of sodium hydroxide. The chlorine atom is released as sodium chloride (NaCl), the hydrogen atom as of water.

Higher molecular weight diglycidyl ethers ($n\geq1$) are formed by the reaction of the bisphenol A diglycidyl ether formed with further bisphenol A, this is called prepolymerization:

Instead of bisphenol A, other bisphenols (especially bisphenol F) or brominated bisphenols (e. g. tetrabromobisphenol A) can be used for the said epoxidation and prepolymerisation. Bisphenol F may undergo epoxy resin formation in a similar fashion to bisphenol A. These resins typically have lower viscosity and a higher mean epoxy content per gram than bisphenol A resins, which (once cured) gives them increased chemical resistance.

Important epoxy resins are produced from combining epichlorohydrin and bisphenol A to give bisphenol A diglycidyl ethers.

Epoxy resins are polymeric or semi-polymeric materials or an oligomer, and as such rarely exist as pure substances, since variable chain length results from the polymerisation reaction used to produce them.

An important criterion for epoxy resins is the epoxide group content. This is expressed as the "epoxide equivalent weight", which is the ratio between the molecular weight of the monomer and the number of epoxide groups. This parameter is used to calculate the mass of co-reactant (hardener) to use when curing epoxy resins. Epoxies are typically cured with stoichiometric or near-stoichiometric quantities of hardener to achieve the best physical properties.

There are several dozen chemicals that can be used to cure epoxy, including amines, imidazoles, anhydrides and photosensitive chemicals.

In general, uncured epoxy resins have only poor mechanical, chemical and heat resistance properties. However, good properties are obtained by reacting the linear epoxy resin with suitable curatives to form three-dimensional cross-linked thermoset structures. This process is commonly referred to as curing or gelation process. Curing of epoxy resins is an exothermic reaction and in some cases produces sufficient heat to cause thermal degradation if not controlled.

Curing may be achieved by reacting an epoxy with itself (homopolymerisation) or by forming a copolymer with polyfunctional curatives or hardeners. This curing is what produces the qualities of the substance such as resistance, durability, versatility, and adhesion. In principle, any molecule containing a reactive hydrogen may react with the epoxide groups of the epoxy resin. Common classes of hardeners for epoxy resins include amines, acids, acid anhydrides, phenols, alcohols and thiols. Relative reactivity (lowest first) is approximately in the order: phenol<anhydride<aromatic amine<cycloaliphatic amine<aliphatic amine<thiol.

While some epoxy resin/hardener combinations will cure at ambient temperature, many require heat, with temperatures up to 150° C. (302° F.) being common, and up to 200° C. (392° F.) for some specialist systems. Insufficient heat during cure will result in a network with incomplete polymerisation, and thus reduced mechanical, chemical and heat resistance. Cure temperature should typically attain the glass transition temperature (Tg) of the fully cured network in order to achieve maximum properties. Temperature is sometimes increased in a step-wise fashion to control the rate of curing and prevent excessive heat build-up from the exothermic reaction.

Hardeners which show only low or limited reactivity at ambient temperature, but which react with epoxy resins at elevated temperature are referred to as latent hardeners. When using latent hardeners, the epoxy resin and hardener may be mixed and stored for some time prior to use, which is advantageous for many industrial processes. Very latent hardeners enable one-component (1K) products to be produced, whereby the resin and hardener are supplied premixed to the end user and only require heat to initiate curing. One-component products generally have shorter shelf-lives than standard 2-component systems, and products may require cooled storage and transport.

The epoxy curing reaction may be accelerated by addition of small quantities of accelerators. Tertiary amines, carboxylic acids and alcohols (especially phenols) are effective accelerators. Bisphenol A is a highly effective and widely used accelerator, but is now increasingly replaced due to health concerns with this substance.

As used in this application, "POSS" refers generally to polyhedral oligomeric silsesquioxane, which is a nanostructured chemical that bridges the gap between ceramic and organic materials. POSS improves product performance without sacrificing mechanical properties and is used in a wide variety of applications. The chemical composition of POSS is a hybrid, intermediate ($RSiO_{1.5}$) between that of silica ($SiO_2$) and silicone ($R_2SiO$). POSS molecules are physically large with respect to polymer dimensions and nearly equivalent in size to many polymer segments and coils. Each POSS molecule contains covalently bond reactive functionalities suitable for polymerization or grafting POSS monomers to polymer chains. Each POSS molecule contains nonreactive organic functionalities for solubility and compatibility of the POSS segments with the various polymer systems. POSS chemical technology is easy-to-use and available in both liquid and solid form. POSS is soluble in most common solvents, resins and monomers and can be used in the same manner as common organic additives, in either monomer or polymeric (resin) form. Enhancements in the physical properties of polymers incorporating POSS segments result from POSS's ability to control the motions of the chains while still maintaining the processability and mechanical properties of the base resin. This is believed to be a result of POSS's nanoscopic size and its relationship to polymer dimensions. Variants of POSS include "POMS" or polyhedral oligomeric metallo-silsesquioxane.

One specific, but non-limiting, illustration of POSS is PEG-POSS illustrated below as Formula (II) in which the "R" groups are $(CH_2)_3O(CH_2CH_2O)_9CH_2CH_2OCH_3$. The choice of R groups is made at least in part to impart solubility to the POSS in the various epoxy resins employed.

Formula (II)

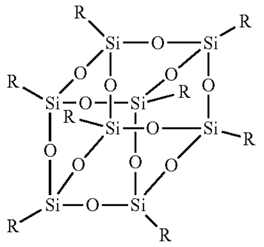

In the above formula, R in Formula (II) is $(CH_2)_3O(CH_2CH_2O)_9CH_2CH_2OCH_3$ but is not limited to the same, and is but an illustrative, non-limiting example.

Illustrated more generically, POSS will have the generic structure illustrated in Formula (I)

Formula (I)

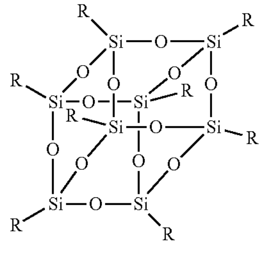

in which each R group may the same or different. Permissible "R" groups include, but are not limited to aliphatic, aromatic, olefinic or alkoxy groups and n, the number of carbon atoms in "R" ranges from 1 to 40 or higher.

For the purposes of explaining this invention, POSS is a nanostructural-cage formula which may have the following generic formula $[RSiO_{1.5}]_{\infty}$ where ∞=degree of polymerization within the material and R=organic substituent (e.g., H, cyclic or linear aliphatic or aromatic groups that may additionally contain reactive functionalities such as alcohols, esters, amines, ketones, olefins, ethers or halides). The degree of polymerization, ∞, can range from 1-1,000,000 or higher into POSS nanostructures. Polysilsesquioxanes may be either homoleptic or heteroleptic. Homoleptic systems contain only one type of R group while heteroleptic systems contain more than one type of R group.

POSS nanostructure compositions are represented by the formula:

| | |
|---|---|
| $[(RSiO_{1.5})_n]_{\Sigma\#}$ | For homoleptic composiitons |
| $[(RSiO_{1.5})_m(R'SiO_{1.5})_n]_{\Sigma\#}$ | For heteroleptic compositions |
| $[(RSiO_{1.5})_m(RXSiO_{1.5})_n]_{\Sigma\#}$ | For functionalized homoleptic compositions |
| $[(RSiO_{1.5})_m(R'SiO_{1.5})_n(RXSiO_{1.0})_p]_{\Sigma\#}$ | For functionalized heteroleptic compositions |

In all of the above, R is the same as defined above and R' is selected from the group defined for R while X includes, but is not limited to OH, Cl, Br, I, alkoxide (OR), acetate (OOCR), peroxide (OOR), amine ($NR_2$), isocyanate (NCO), glycidyl, and R. The symbols m and n refer to the stoichiometry of the composition. The symbol Σ indicates that the composition forms a nanostructure and the symbol # refers to the number of silicon atoms contained within the nanostructure. The value for # is usually the sum of m+n. It should be noted that Σ# is not to be confused as a multiplier for determining stoichiometry, as it merely describes the overall nanostructural characteristics of the POSS system (aka cage size). POSS fragments are defined as structural subcomponents that can be assembled into POSS nanostructures and are represented by the formula $[(RSiO_{1.5})_m(RXSiO_{1.0})_n]$. Note the symbols Σ# are absent as these fragments are not polyhedral nanostructures.

An additional non-limiting series of examples of POSS would also include: EPO408, a hybrid molecule with an inorganic silsesquioxane at the core. This is a more "sticky" POSS and more than likely would require heat and/or solvent to process. EPO408.01.30, a hybrid molecule with an inorganic silsesquioxane at the core and organic epoxycyclohexyl groups attached at the corners of the cage. This formulation contains 30% PGMEA for coating applications. EPO408.01.50, a hybrid molecule with an inorganic silsesquioxane at the core and organic epoxycyclohexyl groups attached at the corners of the cage. This formulation contains a 50% dilution of PGMEA for coating applications. EPO408.03.30, a hybrid mixture with an inorganic silsesquioxane at the core and organic epoxycyclohexyl groups attached at the corners of the cage. The EP0408 POSS® is blended with a reactive epoxycyclohexyl diluent for ease of use. EPO408.04.30, a hybrid mixture with an inorganic silsesquioxane at the core and organic epoxycyclohexyl groups attached at the corners of the cage. The EP0408 POSS® is often blended with a reactive epoxycyclohexyl diluent for ease of use. EPO408.10.30, a hybrid molecule with an inorganic silsesquioxane at the core and organic epoxycyclohexyl groups attached at the corners of the cage.

This formulation contains 30% cyclopentanone for coating applications. EPO409 is a hybrid molecule with an inorganic silsesquioxane at the core and organic glycidyl groups attached at the corners of the cage. EP0409 serves as a high temperature reactive diluent in both aromatic and aliphatic epoxy resin and will increase rubbery plateau modulus. POSS molecules also have robust resistance to environmental degradation such as moisture, oxidation, corrosion and UV radiation. EP0409 is also excellent at dispersing silica particles. EPO.01.50, a hybrid molecule with an inorganic silsesquioxane at the core and organic glycidyl groups attached at the corners of the cage. This formulation contains PGMEA for coating applications. EPO.07.30, Nanosilica Dispersion is two reinforcing agents in one. EP0409 is a hybrid, 1.5 nm molecule with an inorganic silsesquioxane at the core, and organic glycidyl groups attached at the corners of the cage, which acts as a multifunctional crosslinker. 30 weight percent of 20 nm nanosilica is completely dispersed into the EP0409, creating a clear, colorless liquid which is easily blended into other systems. EPO402, Epoxycyclohexyllsobutyl POSS® is used as an impact modifier and hydrophobic epoxide grafting agent. This POSS would need an extra processing step to be functional. EPO418, Glycidyllsobutyl POSS® is used as a grafting agent and chain terminator. It improves toughness. EPO419, is used as a grafting agent and chain terminator. It improves hydrophobic modification. MA0735, a hybrid molecule with an inorganic silsesquioxane at the core and organic methacrylate groups attached at the corners of the cage. MA0736 another variation of POSS in in development with a third party. PG1190-PEG POSS is a hybrid molecule with an inorganic silsesquioxane at the core and organic polyethylene glycol groups attached at the corners of the cage. This rigid core acts like molecular ball bearings and provides high film strength to reduce friction and wear. TH1550-Mercaptopropyllsobutyl POSS® is used as a graftable agent and for surface modification, as well as hydrophobicity improvement. TH1550 is used as a graftable agent and for surface modification, hydrophobicity and plasticization.

General Process Variables Applicable to all Processes

As is typical with chemical processes there are a number of variables that can be used to control the purity, selectivity, rate and mechanism of any process. Variables influencing the process for the conversion of polysilsesquioxanes $[RSiO_{1.5}]_{\infty}$ into POSS structures $[(RSiO_{1.5})_n]_{\Sigma\#}$, $[(RSiO_{1.5})_m(R'SiO_{1.5})_n]_{\Sigma\#}$, $[(RSiO_{1.5})_m(R'SiO_{1.5})_n(RXSiO_{1.0})_p]_{\Sigma\#}$, $[(RSiO_{1.5})_m(RSiO_{1.5})_n(RXSiO_{1.0})_p]_{\Sigma\#}$ include but are not be limited to the following: chemical class of base, silicon-oxygen ring size, composition type $[RSiO_{1.5}]_{\infty}$ (silsesquioxane), $[(RSiO_{1.5})_n(R_2SiO)_n]_{\Sigma\#}$ (silsesquioxane-siloxane), $[(RSiO_{1.5})_m(XSiO_{1.5})_n]_{\Sigma\#}$ (silsesquioxane-silicate), effect of the organic substituents, process temperature, process solvent, process temperature, stoichiometry of base and the presence of a catalyst. Each of these variables is briefly discussed below. The subscripts "m", "n" and "p" represent the stoichiometry of the formula and in general range from 0 (fragment not present) to 100, depending upon synthetic conditions.

Co-Reagent Promoters

Specific chemical agents can be utilized to promote or enhance the effectiveness of the bases utilized in the processes. Specifically, nucleophilic base mixtures that work in combined fashion to firstly solubilize the silsesquioxane and secondly promote formation of the POSS nanostructure. Examples of such systems may include but are not limited to KOR where OR is an alkoxide, RMgX which include all common Grignard reagents, or alkalihalides such as LiI, or any of a variety of molten or fused salt media. In a similar fashion co-bases such as $[Me_3Sn][OH]$ and $[Me_4Sb][OH]$ have been shown to promote chemical transformations of POSS systems yet have not been utilized as a co-reagent in the formation of POSS cages. Alternatively, electrophilic promoters such as zinc compounds, (i.e. $ZnI_2$, $ZnBr_2$, $ZnCl_2$, $ZnF_2$, etc.)aluminum compounds, (i.e. $Al_2H_6$, $LiAlH_4$, $AlI_3$, $AlBr_3$, $AlCl_3$, $AlF_3$, etc.) boron compounds including (i.e. $RB(OH)_2$, $BI_3$, $BBr_3$, $BCl_3$, $BF_3$, etc.) which are known to play important roles in the solubilization and ring-opening polymerization of cyclic silicones and in the ring-opening of polyhedral oligomeric silsesquioxanes.

Chemical Bases

The purpose of the base is to cleave the silicon-oxygen-silicon (Si—O—Si) bonds in the various silsesquioxane structures. The exact type of base, its hydration sphere, concentration, and solvent interactions all play important roles in the effectiveness of the base for cleaving the silicon-oxygen bonds. Proper understanding and control of conditions enable the selective cleavage and/or assembly of silsesquioxane, silicate, POSS, and POSS fragment systems in the desired manner. The base can also assist in the assembly of POSS fragments.

There are a wide range of bases that can be used in the processes and these include but are not limited to: hydroxide $[OH]^-$, organic alkoxides $[RO]^-$, carboxylates $[RCOO]^-$, amides $[RNH]^-$, carboxamides $[RC(O)NR]^-$, carbanions $[R]^-$, carbonate $[CO_3]^{-2}$, sulfate $[SO_4]^{-2}$, phosphate $[PO_4]^{-3}$, biphosphate $[HPO_4]^{-2}$, phosphourus ylides $[R_4P]^-$, nitrate $[NO_3]^-$, borate $[B(OH)_4]^{-1}$, cyanate $[OCN]^-$, fluoride $[F]^-$, hypochlorite $[OCl]^-$, silicate $[SiO_4]^{-4}$, stannate $[SnO_4]^{-4}$ basic metal oxides (e.g. $Al_2O_3$, CaO, ZnO etc.), amines $R_3N$ and amine oxides $R_3NO$, and organomtallics (e.g. RLi, $R_2Zn$, $R_2Mg$, RMgX etc.). Furthermore, the processes taught here are not limited to the above-mentioned bases; rather any reagent can be employed which produces pH spanning the range from 7.1 to 14.

Alternatively, mixtures of bases may also be utilized to carryout the process. One advantage of such an approach is that each of the bases in a given mixture can serve different functions. For example in a mixed base system one base can be used to cleave silicon-oxygen bonds or silicon-X bonds while a second base is used to assemble the POSS structure. Thus synergies can exist amongst several types of bases and these can be utilized to the advantage and refinement of these processes.

Silicon-Oxygen Ring Size, Ring Type and Cage Sizes

The processes discussed in this disclosure are not limited to the formation of specific sizes of POSS cages (i.e $\Sigma\#$ in $[(RSiO_{1.5})_n]_{\Sigma\#}$). Similarly, the processes should not be limited to specific types of silsesquioxanes (i.e. resins, cages or fragments). They can be carried out to manufacture POSS cages containing four to eighteen or more silicon atoms in the silicon-oxygen framework. It has been noted that the silicon-oxygen ring size contained within such POSS systems does however affect the rate at which cage silicon-oxygen ring opening can occur. For example, rings containing three silicon atoms and three oxygen atoms appear to open faster than the larger rings containing 4 silicon atoms and 4 oxygen atoms. The relative rate for the opening of POSS silicon-oxygen rings appears to be six member rings with three silicon atoms>eight member rings with four silicon atoms>ten member rings with five silicon atoms>twelve member rings with six silicon atoms. Selective ring opening processes therefore can be controlled through the use of the appropriate base and knowledge of this information allows the user of these processes to control selective formation of POSS molecules.

Effect of the Organic Substituent, Process Solvents and Process Temperatures

The processes described in this disclosure are not limited to POSS systems bearing specific organic groups (defined as R) attached to the silicon atom of the silicon-oxygen ring systems. They are amenable to silsesquioxane feedstocks bearing a wide variety of organic groups (R=as previously defined) and functionalities (X=as previously defined). The organic substituent R does have a large effect on the solubility of both the final product and the starting POSS material. Therefore, it is envisioned that the different solubilities of the starting silsesquioxanes and POSS products can be used to facilitate the separation and purification of the final reaction products. We currently find no limitation of the process with respect to the type of solvent used and the processes have been carried out in common solvents including but not limited to ketones, ethers, dimethylsulfoxide, $CCl_4$, $CHCl_3$, $CH_2Cl_2$, fluorinated solvents, aromatics (halogenated and nonhalogenated), aliphatic (halogenated and nonhalogenated). Other processes can be carried out in supercritical fluids including but not limited to $CO_2$, $H_2O$, and propane. The variables of solvent type, POSS concentration, and process temperature should be utilized in the standard way to match the specific cage opening process to the equipment available. Preferred solvents for the processes are THF, MIK, and toluene. In many cases the solvent is an integral component of the process, which to enables the base to act on the specific silsesquioxane system, hence solvent effects greatly influence the degree of ionization of the base used in these processes.

As used herein, the term "liquid epoxy resin DER-331" means propane, 2,2-bis [p-(2,3 epoxypropoxy)phenyl]-polymers CAS Reg. #205085-99-8.

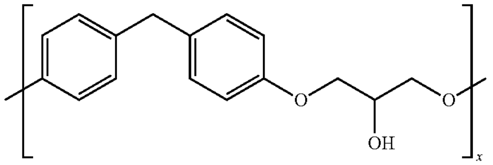

As used herein, the term "Jeffamine D-230" means polyoxypropylene diamine

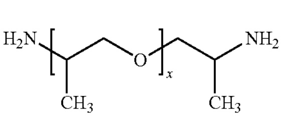

and wherein x~2.5.

As used herein, "Ancamine 2735" means a cyclopolyaliphatic polyamine.

As used herein Nonylphenol EG means para-nonylphenol EG.

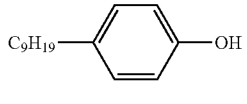

As used herein, the term "BAC Amine 1,3" means 1,3-bis(aminomethyl)cyclohexane.

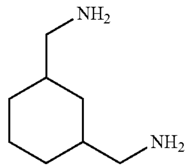

As used herein, the term "Tuball Matrix 203" means is a concentrate based on single wall carbon nanotubes for solvent-based epoxy and polyurethane systems. Graphene nanotubes can be described as a one-atom-thick graphene sheet rolled in a tube more than 5 μm long. The carrier is a blend of fatty acid glycidyl esters and ammonium salts of polyolefin-based derivatives and sold commercially by OCSiAl. It is believed that unlike most conventional conductive fillers such as multiwall carbon nanotubes, carbon fibers, mica and most types of carbon black, Tuball™ graphene nanotubes provide improvements in material properties starting from the addition of just 0.01% by total weight.

As used herein, the term "Tuball Matrix 301" means single-walled carbon nanotubes in alcohols, $C_{12-15}$ branched and linear, ethoxylated propoxylated (CAS No) 120313-48-6 90.

As used herein "Epoxy Dispersion White" means the composition identified in Table II.

As used herein, the term "ChemMod 8 reactive diluent" means $C_{12}$-$C_{14}$ aliphatic glycidyl ether sold commercially by Cargill.

As used herein, the term BYK 066 means a silicone defoamer for solvent-free and solvent-borne coatings, printing inks, and ambient curing plastic systems on the basis of epoxy resin and polyurethane and sold commercially by Byk Additives and Instruments.

As used herein, the term "Borchers Borchi Gen 1252" a 100% acrylic ester copolymer with wetting and deflocculation properties systems sold commercially by Borchers GmbH.

As used herein, the term "Blanc Fix" means barium sulfate.

As used herein, the term "Heloxy 62" means o-cresyl glycidyl ether, a low viscosity aromatic monoepoxide, its primary use is the viscosity reduction of conventional epoxy resin systems sold commercially by Hexion.

As used herein "BYK P104S" means a proprietary wetting agent commercially available from BYK.

As used herein "Foam-A-Tac 2-241-56" means a proprietary defoamer commercially available from Enterprise Specialty Products, Inc.

As used herein "Tego Wet 270" means a flow control agent based on a polyether siloxane copolymer sold commercially by Evonik.

As used herein "PEG POSS 1190" means the chemical moiety illustrated in Formula II.

As used herein "POSS EPO 409" means glycidyl POSS wherein R is the glycidyl group).

As used herein "Bis-F-Epoxy resin Epon 869 type" means a liquid epoxy resin formed by the reaction of Bisphenol-F and epichlorohydrin.

As used herein "Disperbyk 110" means a wetting and dispersing additive for solvent-borne and solvent-free coatings and printing inks for stabilizing inorganic pigments, in particular titanium dioxide.

As used herein "Disberbyk 2163" means a solution of a high molecular weight block copolymer with pigment affinic groups.

As used herein Disperbyk 167 means a solution of a high molecular weight block copolymer with pigment affinic groups having an amine value of approximately 12.5 mg KOH/g.

As used herein "Byk 320" means a solution of a polyether-modified polymethylalkylsiloxane leveling aid.

As used herein "Orisil 200 fumed silica" means silicon dioxide (amorphous).

As used herein, the synthetic process involved the formation of a two-part epoxy system. To make the two-part coating, a 2:1 ratio by volume of two parts of Part A to one part of Part B were added.

Base Formulation of Epoxy Dispersion White (Table II)

| Reactant | Wt. | Wt. % |
|---|---|---|
| Liquid Epoxy Resin DER-331 | 21.55 | 21.55% |
| ChemMod 8 reactive diluent | 2.80 | 2.80% |
| BYK 066 | 0.25 | 0.25% |
| Borchers Borchi Gen 1252 | 1.55 | 1.55% |
| $TiO_2$ | 51.76 | 51.76% |
| Blanc Fix | 9.13 | 9.13% |
| Liquid Epoxy Resin DER-331 | 10.15 | 10.15% |
| ChemMod 8 reactive diluent | 2.80 | 2.80% |

The process involved the following steps: To a clean vessel add liquid epoxy resin and ChemMod 8; turn on the mixer followed by adding BYK 066 and Borchers Borchi Gen 1252; mix for 10 minutes at medium speed until homogeneous; add ½ of the $TiO_2$ into the vortex at medium speed; add the remaining half of the $TiO_2$ while mixing at high speed and grind for 20 minutes; check the grind using a grind gauge; continue grinding until grind passes; add the Blanc Fixe barium sulfate, the remaining liquid epoxy resin and the remaining ChemMod 8; mix for 10 minutes, then measure tint strength.

Example #1 (8.6:1 PEG POSS to Carbon Nanotubes)

| | Wt. | Wt. % |
|---|---|---|
| EPOXY PART A | | |
| Liquid Epoxy Resin (DER-331 type) | 61.52 | 61.52% |
| Tuball Matrix 203 | 0.40 | 0.40% |
| Epoxy Dispersion White | 18.52 | 18.52% |
| Heloxy 62 | 8.39 | 8.39% |
| Benzyl Alcohol | 6.99 | 6.99% |
| BYK P104S | 0.17 | 0.17% |
| Foam-A-Tac 2-241-56 | 0.11 | 0.11% |
| Tego Wet 270 | 0.44 | 0.44% |
| PEG POSS 1190 | 3.45 | 3.45% |
| | 100.00 | 100.00% |
| EPOXY PART B | | |
| Jeffamine D-230 | 24.78 | 24.78% |
| Ancamine 2735 | 53.27 | 53.27% |
| Nonyl Phenol EG | 15.31 | 15.31% |
| BAC Amine 1,3 | 6.64 | 6.64% |
| | 100.00 | 100.00% |

-continued

| | Wt. | Wt. % |
|---|---|---|

The process involved the following steps:

For Part A, to a clean vessel with a 16 inch blade, add the liquid epoxy resin and begin agitation; add the Tuball Matrix and increase blade speed to 600 rpm (tip speed of 12.8 m/sec); agitate at 600 rpm for 30 minutes. In a separate vessel, stir the epoxy dispersion white for a minimum of 10 minutes to assure consistency; add the epoxy dispersion white to the vessel, then add the Heloxy 62, benzyl alcohol, the BYKP104S, the Foam-A-Tax 2-241-56, the TegoWet 270 and the POSS 1190. Mix the batch for 20 minutes.

For Part B, to a clean tank add the Jeffamine D-230 and begin agitation; add the Ancamine 2735, nonyl phenol EG and BAC Amine 1,3; and mix the batch for 15 minutes.

Example #2 (No Addition of POSS)

| | Wt. | Wt. % |
|---|---|---|
| EPOXY PART A | | |
| Liquid Epoxy Resin (DER-331 type) | 61.62 | 63.76% |
| Tuball Matrix 203 | 0.40 | 0.41% |
| Epoxy Dispersion White | 18.52 | 19.17% |
| Heloxy 62 | 8.39 | 8.68% |
| Benzyl Alcohol | 6.99 | 7.23% |
| BYK P104S | 0.17 | 0.18% |
| Foam-A-Tac 2-241-56 | 0.11 | 0.11% |
| Tego Wet 270 | 0.44 | 0.46% |
| | 96.65 | 100.00% |
| EPOXY PART B | | |
| Jeffamine D-230 | 24.78 | 24.78% |
| Ancamine 2735 | 53.27 | 53.27% |
| Nonyl Phenol EG | 15.31 | 15.31% |
| BAC Amine 1,3 | 6.64 | 6.64% |
| | 100.00 | 100.00% |

As seen in Table III, the Reflected Image Quality ("RIQ") was unacceptably low indicating an "orange-peel surface".

The process involved the following steps:

For Part A, to a clean vessel with a 16 inch blade, add the liquid epoxy resin and begin agitation; add the Tuball Matrix and increase blade speed to 600 rpm (tip speed of 12.8 m/sec); Agitate at 600 rpm for 30 minutes. In a separate vessel, stir the epoxy dispersion white for a minimum of 10 minutes to assure consistency; add the epoxy dispersion white to the vessel; then add the Heloxy 62, the benzyl alcohol, the BYKP104S, the Foam-A-Tac 2-241-56, and the TegoWet 270. Mix the batch for 20 minutes.

For Part B, To a clean tank add the Jeffamine D-230 and begin agitation; Next add the Ancamine 2735, nonyl phenol EG and BAC Amine 1,3; and mix the batch for 15 minutes.

Example #3 (POSS Added at a Concentration of ½ that of Example #1-4.33:1 POSS/Carbon Nanotubes)

-continued

| | Wt. | Wt. % |
|---|---|---|
| EPOXY PART A | | |
| Liquid Epoxy Resin (DER-331 type) | 61.52 | 62.60% |
| Tuball Matrix 203 | 0.40 | 0.41% |
| Epoxy Dispersion White | 18.52 | 18.85% |
| Heloxy 62 | 8.39 | 8.54% |
| Benzyl Alcohol | 6.99 | 7.11% |
| BYK P104S | 0.17 | 0.17% |
| Foam-A-Tac 2-241-56 | 0.11 | 0.11% |
| Tego Wet 270 | 0.44 | 0.45% |
| PEG POSS 1190 | 1.73 | 1.76% |
| | 98.27 | 100.00% |
| EPOXY PART B | | |
| Jeffamine D-230 | 24.78 | 24.78% |
| Ancamine 2735 | 53.27 | 53.27% |
| Nonyl Phenol EG | 15.31 | 15.31% |
| BAC Amine 1,3 | 6.64 | 6.64% |
| | 100.00 | 100.00% |

The process involved the following steps:

For Part A, to a clean vessel with a 16 inch blade, add the liquid epoxy resin and begin agitation; add the Tuball Matrix and increase blade speed to 600 rpm (tip speed of 12.8 m/sec). Agitate at 600 rpm for 30 minutes. In a separate vessel, stir the epoxy dispersion white for a minimum of 10 minutes to assure consistency; add the epoxy dispersion white to the vessel; then add the Heloxy 62, the Benzyl alcohol, the BYKP104S, the Foam-A-Tax 2-241-56, and the TegoWet 270. Mix the batch for 20 minutes.

For Part B, to a clean tank add the Jeffamine D-230 and begin agitation; Next add the Ancamine 2735, nonyl phenol EG and BAC Amine 1,3; and mix the batch for 15 minutes.

Example #4 (Impact of the Order of Addition of Reactants)

| | Wt. | Wt. % |
|---|---|---|
| EPOXY PART A | | |
| Liquid Epoxy Resin (DER-331 type) | 61.52 | 61.52% |
| Tuball Matrix 203 | 0.40 | 0.40% |
| PEG POSS 1190 | 3.45 | 3.45% |
| Epoxy Dispersion White | 18.52 | 18.52% |
| Heloxy 62 | 8.39 | 8.39% |
| Benzyl Alcohol | 6.99 | 6.99% |
| BYK P104S | 0.17 | 0.17% |
| Foam-A-Tac 2-241-56 | 0.11 | 0.11% |
| Tego Wet 270 | 0.44 | 0.44% |
| | 99.99 | 100.00% |
| EPOXY PART B | | |
| Jeffamine D-230 | 24.78 | 24.78% |
| Ancamine 2735 | 53.27 | 53.27% |
| Nonyl Phenol EG | 15.31 | 15.31% |
| BAC Amine 1,3 | 6.64 | 6.64% |
| | 100.00 | 100.00% |

The process involved the following steps:

For Part A, to a clean vessel with a 16 inch blade, add the liquid epoxy resin and begin agitation; add the Tuball Matrix and the PEG POSS 1190. Increase blade speed to 600 rpm (tip speed of 12.8 m/sec). Agitate at 600 rpm for 30 minutes. In a separate vessel, stir the epoxy dispersion white for a minimum of 10 minutes to assure consistency; add the epoxy dispersion white to the vessel; then add the Heloxy 62, the benzyl alcohol, the BYKP104S, the Foam-A-Tax 2-241-56, and the TegoWet 270; and mix the batch for 20 minutes.

For Part B, to a clean tank add the Jeffamine D-230 and begin agitation; next add the Ancamine 2735, nonyl phenol EG and BAC Amine 1,3; and mix the batch for 15 minutes.

Note that Examples #1 and #4 have the same composition, but the order of the addition of PEG POSS was different. As illustrated in Table III, only Example #1 was color-stable, thereby indicating that synthetic order plays a role in the final product. There is a value in adding the POSS reactant toward the end of the other additives as shown above. Adding POSS at the beginning of the reactant addition, did not result in a color-stable product when adding POSS toward the end of all of the additives in Part A of the epoxy, did result in a color-stable product.

Example #5 (Addition of POSS and Carbon Nanotubes into Part B Rather than Part A)

| | Wt. | Wt. % |
|---|---|---|
| EPOXY PART A | | |
| Liquid Epoxy Resin DER-331 | 66.80 | 69.14% |
| Heloxy 62 | 3.52 | 3.64% |
| Benzyl Alcohol | 7.03 | 7.28% |
| Epoxy Dispersion White | 19.00 | 19.66% |
| Foam-A-Tac 2-241-56 | 0.12 | 0.12% |
| Tego Wet 270 | 0.15 | 0.16% |
| | 96.62 | 100.00% |
| EPOXY PART B | | |
| Jeffamine D-230 | 24.78 | 18.80% |
| Ancamine 2735 | 53.27 | 40.43% |
| Nonyl Phenol EG | 15.31 | 11.62% |
| BAC Amine 1,3 | 6.64 | 5.04% |
| Tuball Matrix 203 | 3.30 | 2.50% |
| PEG POSS 1190 | 28.46 | 21.60% |
| | | 100.00% |

The process involved the following steps:

For Part A, to a clean vessel with a 16 inch blade, add the liquid epoxy resin and begin agitation; add the Heloxy 62, benzyl alcohol, Epoxy Dispersion White, Foam-A-Tac 2-241-56 and Tego Wet 270; and mix for 45 minutes For Part B, to a clean tank charge the Jeffamine D-230; turn on mixer then add Ancamine 2735, nonyl phenol EG and BAC Amine; mix for 45 minutes; add the PEG POSS and the Tuball Matrix 203; Increase the blade speed to achieve a tip speed between 7-15 m/sec); and agitate for 30 minutes.

Example #6 (No $TiO_2$ Pigment Added)

| | Wt. (g) | Wt. % |
|---|---|---|
| EPOXY PART A | | |
| Liquid Epoxy Resin (DER-331 type) | 69.44 | 69.44% |
| Tuball Matrix 203 | 0.35 | 0.35% |
| Heloxy 62 | 8.66 | 8.66% |
| Benzyl Alcohol | 7.00 | 7.00% |
| ChemMod-8 (reactive diluent) | 1.05 | 1.05% |
| Foam-A-Tac 2-241-56 | 0.11 | 0.11% |
| Tego Wet 270 | 0.45 | 0.45% |
| PEG POSS 1190 | 3.56 | 3.56% |
| 4095 High Strength Black | 9.38 | 9.38% |
| | | 100.00% |
| EPOXY PART B | | |
| Jeffamine D-230 | 24.78 | 24.78% |
| Ancamine 2735 | 53.27 | 53.27% |
| Nonyl Phenol EG | 15.31 | 15.31% |
| BAC Amine 1,3 | 6.64 | 6.64% |
| | 100.00 | 100.00% |

The process involved the following steps:

For Part A, to a clean vessel with a 16 inch blade, add the liquid epoxy resin and begin agitation; add the Tuball Matrix and increase blade speed to 600 rpm (tip speed of 12.8 m/sec); agitate at 600 rpm for 30 minutes; then add the Heloxy 62, the benzyl alcohol, the ChemMode 8, the Foam-A-Tax 2-241-56, the TegoWet 270 and the PEG POSS 1190; mix the batch for 20 minutes; add the 4095 High Strength Black pigment and then mix for 5 minutes.

For Part B, To a clean tank add the Jeffamine D-230 and begin agitation; next add the Ancamine 2735, nonyl phenol EG and BAC Amine 1,3; and mix the batch for 15 minutes.

Example #7 (Addition of Other Additives Negatively Impacting RIQ)

| | Wt. | Wt. % |
|---|---|---|
| EPOXY PART A | | |
| Liquid Epoxy Resin (DER-331 type) | 366.89 | 45.86% |
| Benzyl Alcohol | 36.86 | 4.61% |
| Bis-F Epoxy Resin Epon 869-type | 40.21 | 5.03% |
| Disperbyk 110 | 62.36 | 7.79% |
| Disberbyk 2163 | 12.07 | 1.51% |
| Disperbyk 167 | 12.07 | 1.51% |
| Byk 066 | 2.55 | 0.32% |
| Byk 320 | 3.15 | 0.39% |
| Tuball Matrix 301 | 1.54 | 0.19% |
| POSS EPO 409 | 17.79 | 2.22% |
| TiO2 Ti-Pure R-960 | 187.64 | 23.45% |
| Calcium Carbonate Vicron 15-15 | 33.42 | 4.18% |
| Benzyl Alcohol | 23.45 | 2.93% |
| | 800.00 | 100.00% |
| EPOXY PART B | | |
| Ancamine 2489 | 292.73 | 73.18% |
| Nonyl Phenol EG | 48.79 | 12.20% |
| Benzyl Alcohol | 54.52 | 13.63% |
| Orisil 200 Fumed Silica | 3.96 | 0.99% |
| | 400.00 | 100.00% |

The process involved the following steps:

For Part A, to a clean vessel with a 16 inch blade, add the liquid epoxy resin and begin agitation; add the benzyl alcohol, Bis-F epoxy resin, Disperbyk 110, Disperbyk 2163, Disperbyk 167, Byk 066 and Byk 320 and mix until evenly blended; add the Tuball Matrix 301 and increase blade speed to 600 rpm (tip speed of 12.8 m/sec); agitate at 600 rpm for 10 minutes; add the POSS EPO 409 and mix at 600 rpm for 30 minutes; add the Ti-Pure R-960 $TiO_2$ and grind for 30 minutes; add the Vicron 15-15 and blend until mixture is smooth with no chunks; and add the Benzyl alcohol and mix for 15 minutes.

For Part B, to a clean tank add the Ancamine 2489; turn on mixer, then add nonyl phenol EG, benzyl alcohol; add in the Orisil 200 and blend until smooth with no clumps; mix an additional 15 minutes.

Example #8 (Use of a Single Amine in Part B)

| | Wt. | Wt. % |
|---|---|---|
| EPOXY PART A | | |
| Liquid Epoxy Resin (DER-331 type) | 61.52 | 61.52% |
| Tuball Matrix 203 | 0.40 | 0.40% |
| Epoxy Dispersion White | 18.52 | 18.52% |
| Heloxy 62 | 8.39 | 8.39% |
| Benzyl Alcohol | 6.99 | 6.99% |
| BYK P1045 | 0.17 | 0.17% |
| Foam-A-Tac 2-241-56 | 0.11 | 0.11% |
| Tego Wet 270 | 0.44 | 0.44% |
| PEG POSS 1190 | 3.45 | 3.45% |
| | 100.00 | 100.00% |
| EPOXY PART B | | |
| Ancamine 2735 | 38.41 | 100.00% |

The process involved the following steps:

Part A: To a clean vessel with a 16 inch blade, add the liquid epoxy resin and begin agitation. Add the Tuball Matrix and increase blade speed to 600 rpm (tip speed of 12.8 m/sec). Agitate at 600 rpm for 30 minutes. In a separate vessel, stir the epoxy dispersion white for a minimum of 10 minutes to assure consistency. Add the epoxy disersion white to the vessel and then add the Heloxy 62, the Benzyl alcohol, the BYKP104S, the Foam-A-Tax 2-241-56, the TegoWet 270 and the POSS 1190. Mix batch for 20 minutes.

Stir Parts A & B to assure uniformity. Mix 200 parts by volume of Part A to 38.41 parts by weight of part B. Apply a wet film and allow to air dry.

While amine blends have been illustrated in many of the examples above, there is no need to limit the invention to blends. In fact, one amine is sufficient to product an effective epoxy resin as illustrated above.

Example #9 (Similar to Example #1 but with a 7:1 Ratio of PEG POSS to Carbon Nanotubes)

| | Wt. | Wt. % |
|---|---|---|
| EPOXY PART A | | |
| Liquid Epoxy Resin (DER-331 type) | 61.52 | 61.93% |
| Tuball Matrix 203 | 0.40 | 0.40% |
| Epoxy Dispersion White | 18.52 | 18.65% |
| Heloxy 62 | 8.39 | 8.45% |
| Benzyl Alcohol | 6.99 | 7.04% |
| BYK P104S | 0.17 | 0.17% |
| Foam-A-Tac 2-241-56 | 0.11 | 0.11% |
| Tego Wet 270 | 0.44 | 0.44% |
| PEG POSS 1190 | 2.80 | 2.82% |
| | 99.35 | 100.00% |
| EPOXY PART B | | |
| Jeffamine D-230 | 24.78 | 24.78% |
| Ancamine 2735 | 53.27 | 53.27% |

-continued

| | Wt. | Wt. % |
|---|---|---|
| Nonyl Phenol EG | 15.31 | 15.31% |
| BAC Amine 1,3 | 6.64 | 6.64% |
| | 100.00 | 100.00% |

The process involved the following steps:

Part A: To a clean vessel with a 16 inch blade, add the liquid epoxy resin and begin agitation. Add the Tuball Matrix and increase blade speed to 600 rpm (tip speed of 12.8 m/sec). Agitate at 600 rpm for 30 minutes. In a separate vessel, stir the epoxy dispersion white for a minimum of 10 minutes to assure consistency. Add the epoxy dispersion white to the vessel. Then add the Heloxy 62, the Benzyl alcohol, the BYKP104S, the Foam-A-Tax 2-241-56, the TegoWet 270 and the POSS 1190. Mix batch for 20 minutes Part B: To a clean tank add the Jeffamine D-230 and begin agitation. Next add the Stir Parts A & B to assure uniformity. Apply 2 parts by volume of Part A to 1 part by volume of part B. Apply a wet film and allow to air dry.

Example #10 (Similar to Example #1 but with a 6:1 Ratio of PEG POSS to Carbon Nanotubes)

| | Wt. | Wt. % |
|---|---|---|
| EPOXY PART A | | |
| Liquid Epoxy Resin (DER-331 type) | 61.52 | 62.18% |
| Tuball Matrix 203 | 0.40 | 0.40% |
| Epoxy Dispersion White | 18.52 | 18.72% |
| Heloxy 62 | 8.39 | 8.48% |
| Benzyl Alcohol | 6.99 | 7.06% |
| BYK P104S | 0.17 | 0.17% |
| Foam-A-Tac 2-241-56 | 0.11 | 0.11% |
| Tego Wet 270 | 0.44 | 0.45% |
| PEG POSS 1190 | 2.40 | 2.43% |
| | 98.95 | 100.00% |
| EPOXY PART B | | |
| Jeffamine D-230 | 24.78 | 24.78% |
| Ancamine 2735 | 53.27 | 53.27% |
| Nonyl Phenol EG | 15.31 | 15.31% |
| BAC Amine 1,3 | 6.64 | 6.64% |
| | 100.00 | 100.00% |

The process involved the following steps:

Part A: To a clean vessel with a 16 inch blade, add the liquid epoxy resin and begin agitation. Add the Tuball Matrix and increase blade speed to 600 rpm (tip speed of 12.8 m/sec). Agitate at 600 rpm for 30 minutes. In a separate vessel, stir the epoxy dispersion white for a minimum of 10 minutes to assure consistency. Add the epoxy dispersion white to the vessel. Then add the Heloxy 62, the Benzyl alcohol, the BYKP104S, the Foam-A-Tax 2-241-56, the TegoWet 270 and the POSS 1190. Mix batch for 20 minutes Part B: To a clean tank add the Jeffamine D-230 and begin agitation. Next add the Stir Parts A & B to assure uniformity. Apply 2 parts by volume of Part A to 1 part by volume of part B. Apply a wet film and allow to air dry.

Example #11 (Similar to Example #1 but with a 5:1 Ratio of PEG POSS to Carbon Nanotubes)

| | Wt. | Wt. % |
|---|---|---|
| EPOXY PART A | | |
| Liquid Epoxy Resin (DER-331 type) | 61.52 | 62.43% |
| Tuball Matrix 203 | 0.40 | 0.41% |
| Epoxy Dispersion White | 18.52 | 18.80% |
| Heloxy 62 | 8.39 | 8.51% |
| Benzyl Alcohol | 6.99 | 7.09% |
| BYK P104S | 0.17 | 0.17% |
| Foam-A-Tac 2-241-56 | 0.11 | 0.11% |
| Tego Wet 270 | 0.44 | 0.45% |
| PEG POSS 1190 | 2.00 | 2.03% |
| | 98.55 | 100.00% |
| EPOXY PART B | | |
| Jeffamine D-230 | 24.78 | 24.78% |
| Ancamine 2735 | 53.27 | 53.27% |
| Nonyl Phenol EG | 15.31 | 15.31% |
| BAC Amine 1,3 | 6.64 | 6.64% |
| | 100.00 | 100.00% |

The process involved the following steps:

Part A: To a clean vessel with a 16 inch blade, add the liquid epoxy resin and begin agitation. Add the Tuball Matrix and increase blade speed to 600 rpm (tip speed of 12.8 m/sec). Agitate at 600 rpm for 30 minutes. In a separate vessel, stir the epoxy dispersion white for a minimum of 10 minutes to assure consistency. Add the epoxy dispersion white to the vessel. Then add the Heloxy 62, the Benzyl alcohol, the BYKP104S, the Foam-A-Tax 2-241-56, the TegoWet 270 and the POSS 1190. Mix batch for 20 minutes Part B: To a clean tank add the Jeffamine D-230 and begin agitation. Next add the Ancamine 2735, Nonyl Phenol EG and BAC Amine 1,3. Mix Batch for 15 minutes.

Summary (Table III)

| | Conductivity (Ohms) | Color Stable | RIQ* | Gloss (20°) | Hardness (Shore D) |
|---|---|---|---|---|---|
| Ex. #1 | $1.0 \times 10^7$ | Yes | 62.19 | 90.39 | >80 |
| Ex. #2 (No POSS) | $1.0 \times 10^7$ | Yes | 15.40 | 90.1 | >80 |
| Ex. #3 (½ POSS amt.) | $1.0 \times 10^7$ | Yes | 20.20 | 80.4 | >80 |
| Ex. #4 (POSS before White Dispersion) | $1.0 \times 10^7$ | No | 54.52 | 90 | >80 |
| Ex. #5 (Nanotubes and POSS in Part B) | $1.0 \times 10^6$ | No | 56.18 | 100 | >79 |
| Ex. #6 (Black, No TiO2) | $1.0 \times 10^7$ | Yes | 64.80 | 86 | >80 |
| Ex. #7 (Additive Loaded) | $1.0 \times 10^8$ | No | 14.38 | 46.8 | >80 |
| Ex. #8 (single amine) | $1.0 \times 10^7$ | Yes | N/A | N/A | ~61.83 |
| Ex. #9 @ 7:1 POSS:nanotubes | $1.0 \times 10^7$ | Yes | 42.40 | N/A | >80 |
| Ex. #9 @ 6:1 POSS:nanotubes | $1.0 \times 10^7$ | Yes | 42.20 | N/A | >80 |
| Ex. #9 @ 5:1 POSS:nanotubes | $1.0 \times 10^7$ | Yes | 38.00 | N/A | >80 |

*RIQ = reflected image quality

What is illustrated above is that this invention appears to need a minimum ratio of POSS/carbon nanotubes, which is a minimum of 5:1, more preferably 7:1, and most preferably 8.5:1.

In coating, orange peel has a huge impact on high quality finishes. This undesirable effect reduces appearance quality and is caused by poorly applied coating or incorrect formulation. Though the orange peel effect is visible to human eye, visual evaluation is tedious and subjective.

To measure orange peel objectively and consistently, measurement parameters such as Distinctness of Image (DOI) and Reflected Image Quality (RIQ) would be needed. Both DOI and RIQ are parameters that measure how clearly a reflected image will appear in a surface. A perfectly smooth surface which reflects an image without any distortion has a DOI/RIQ value of 100.

In the automotive industry, coating technology has reached a level where DOI data is insufficient to evaluate orange peel.

As the amounts of orange peel lessen, highly reflective surfaces are gradually showing marginal difference between their DOI values that is not in proportion to their visual difference.

To achieve a more proportionate result, RIQ can be used as this measurement parameter provides a much higher resolution results that correlate well with human perception.

In general, the invention resides in the following:

| | Component | Wt. % (pigmented coating) | Wt. % (non-pigmented coating) |
|---|---|---|---|
| Part A | polyepoxides | 42-95 | 42-95 |
| | Single wall carbon nanotubes | 0.25-1.0 | 0.25-1.0 |
| | $TiO_2$ | 5-20 | |
| | polyhedral oligomeric silsesquioxane | 1-5 | 1-5 |
| | Additives | 0.1-10 | 0.1-10 |
| Part B | Polyfunctional primary amines | 0.1-100 | 0.1-100 |
| | Optional Thiols | 0.1-100 | 0.1-100 |
| | Additives | 0.1-10 | 0.1-10 |

in which the noted reactants add up to 100%.

In the synthesis of a white composition using pre-dispersed $TiO_2$:

(A) Part A
- (1) resin
- (2) single-walled carbon nanotubes with required agitation;
- (3) white dispersion;
- (4) additives;
- (5) polyhedral oligomeric silsesquioxane; and
- (6) post-addition of other pigments to achieved desired color.

(B) Part B
- (1) polyfunctional amines (preferably primary); or
- (2) optional thiol(s).

Part A is mixed with Part B in a 2:1 ratio to make the coating.

In the synthesis of a white composition and dispersing the $TiO_2$ in the epoxy resin:

(A) Part A
- (1) resin;
- (2) $TiO_2$/dispersing aid/defoamer-disperse with required agitation;
- (3) cool to temperature;
- (4) addition of single-walled carbon nanotubes with required agitation;

(5) additives;
(6) polyhedral oligomeric silsesquioxane; and
(7) post-addition of other pigments to achieve the desired color.

(B) Part B
(1) polyfunctional amines (preferably primary); or
(2) thiol(s).

Part A is mixed with Part B in a 2:1 ratio to make the coating.

In the synthesis of a pigmented coating that does not require white:

(A) Part A
(1) resin
(2) single-walled carbon nanotubes with required agitation;
(3) polyhedral oligomeric silsesquioxane; and
(4) Additives.

(B) Part B
(1) polyfunctional amines (preferably primary); or
(2) optional thiol(s).

Part A is mixed with Part B in a 2:1 ratio to make the coating.

While flooring applications are illustrated in the examples, there is no need to limit the invention to such, and any application in which electrostatic dissipative characteristics are needed, are applicable to this invention.

The invention is further described with reference to the following embodiments:

In a first embodiment of the invention, a composition is described which comprises: at least one two-part epoxy resin; Part A of the epoxy resin comprising at least one polyepoxide; and Part B of the epoxy resin comprising at least one amine hardener; at least one single-walled carbon nanotube; at least one polyhedral silsesquioxane; a coated composition of the two-part epoxy resin having a conductivity of a maximum of $1.0\times10^9$ ohms; and the composition having a gloss as measured by a reflected image quality of the coated composition is at least 50.

In a second embodiment of the first embodiment, a weight ratio of the polyhedral silsesquioxane to single-walled carbon nanotube ranges from about 4:1 to 10:1 inclusive.

In a third embodiment of the second embodiment, the weight ratio of polyhedral silsesquioxane to single-walled carbon nanotube is at least 5:1.

In a fourth embodiment of the third embodiment, the weight ratio of polyhedral oligomeric silsesquioxane to single-walled carbon nanotube is at least 7:1.

In a fifth embodiment of the fourth embodiment, the weight ratio of polyhedral oligomeric silsesquioxane to single-walled carbon nanotube is at least 8.5:1.

In a sixth embodiment of the first embodiment, the composition further comprises a pigment.

In a seventh embodiment of the sixth embodiment, the pigment is a titanium dioxide.

In an eighth embodiment of the sixth embodiment, the pigment is a carbon black.

In a ninth embodiment of the first embodiment, the at least one amine hardener is a blend of at least two amine hardeners.

In a tenth embodiment of the ninth embodiment, the at least one amine hardener is a blend of at least three amine hardeners having a Shore D hardness >80.

In an eleventh embodiment of the first embodiment, the reflected image quality is at least 60.

In a twelfth embodiment of the first embodiment, the gloss (20°) is at least 80.

In a thirteenth embodiment of the first embodiment, the polyhedral silsesquioxane is selected from the group consisting of homoleptic compositions, heteroleptic compositions, functionalized homoleptic compositions and functionalized heteroleptic compositions.

In a fourteenth embodiment of the thirteenth embodiment, the homoleptic compositions are $[(RSiO_{1.5})_n]_{\Sigma\#}$; the heteroleptic compositions are $[(RSiO_{1.5})_m(R'SiO_{1.5})_n]_{\Sigma\#}$; the functionalized homoleptic compositions are $[(RSiO_{1.5})_m(RXSiO_{1.5})_n]_{\Sigma\#}$; the functionalized heteroleptic compositions are $[(RSiO_{1.5})_m(R'SiO_{1.5})_n(RXSiO_{1.0})_p]_{\Sigma\#}$; and wherein R and R' are independently selected from the group consisting of 1 to 40 carbon aliphatic, aromatic, olefinic or alkoxy groups; m, n and p represent the stoichiometry of the formula composition and ranges from 0 to 100 inclusive; ∞ is the degree of polymerization and ranges from 1 to 1,000,000 inclusive; τ indicates that the composition forms a nanostructure; and # refers to the number of silicon atoms contained within the nanostructure and is equal to the sum of m+n.

In a fifteenth embodiment of the first embodiment, the single-walled carbon nanotubes are a one-atom-thick graphene sheet rolled in a tube more than 5 μm long.

In a sixteenth embodiment of the first embodiment, the composition is applied to a floor.

In a seventeenth embodiment, a process for the synthesis of a two-part epoxy resin is described, wherein Part A of the epoxy resin comprises at least one polyepoxide; and Part B of the epoxy resin comprises at least one amine hardener; and wherein the sequence of addition comprising: adding at least one single-walled carbon nanotube to Part A of the liquid epoxy resin with agitation; followed by adding at least one other additive to the epoxy resin; followed by adding at least one polyhedral silsesquioxane; followed by adding Part B of the epoxy resin, the composition having a conductivity of a maximum of $1.0\times10^9$ ohms; and the composition having a gloss as measured by a reflected image quality of at least 50.

In an eighteenth embodiment of the seventeenth embodiment, the step of adding Part B comprises the addition of at least two amine hardeners.

In a nineteenth embodiment of the eighteenth embodiment, the step of adding Part B comprises the addition of a blend of at least three amine hardeners.

In a twentieth embodiment of the seventeenth embodiment, the step of adding the at least one single-walled carbon nanotube is in a weight ratio of polyhedral silsesquioxane to single-walled carbon nanotube is at least 8.5:1 by weight.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A composition comprising:

at least one two-part epoxy resin;

Part A of the epoxy resin comprising at least one polyepoxide and at least one polyhedral silsesquioxane, the at least one polyhedral silsesquioxane including an inorganic silsesquioxane at the core and at least one organic polyethylene glycol group attached at a corner of the core;

Part B of the epoxy resin comprising at least one amine hardener;

at least one single-walled carbon nanotube;

the composition having a conductivity of a maximum of $1.0\times10^9$ ohms; and the composition having a gloss as measured by a reflected image quality of at least 50.

2. The composition of claim 1 wherein a weight ratio of the polyhedral silsesquioxane to single-walled carbon nanotube ranges from about 4:1 to 10:1 inclusive.

3. The composition of claim 2 wherein the weight ratio of the polyhedral silsesquioxane to single-walled carbon nanotube is at least the weight ratio is 5:1.

4. The composition of claim 3 wherein the weight ratio of the polyhedral silsesquioxane to single-walled carbon nanotube is at least 7:1.

5. The composition of claim 4 wherein the weight ratio of the polyhedral silsesquioxane to single-walled carbon nanotube is at least 8.5:1.

6. The composition of claim 1 which further comprises: a pigment.

7. The composition of claim 6 wherein the pigment comprises a titanium dioxide.

8. The composition of claim 6 wherein the pigment comprises a carbon black.

9. The composition of claim 1 wherein the at least one amine hardener is a blend of at least two amine hardeners.

10. The composition of claim 9 wherein the at least one amine hardener is a blend of at least three amine hardeners having a coated composition with a Shore D hardness >80.

11. The composition of claim 1 wherein the reflected image quality of the two-part epoxy resin is at least 60.

12. The composition of claim 1 wherein the gloss (20°) of the two-part epoxy resin is at least 80.

13. The composition of claim 1 wherein the polyhedral silsesquioxane is selected from the group consisting of homoleptic compositions, heteroleptic compositions, functionalized homoleptic compositions and functionalized heteroleptic compositions.

14. The composition of claim 13 wherein the homoleptic compositions are $[(RSiO_{1.5})_n]_{\Sigma\#}$;

the heteroleptic compositions are $[(RSiO_{1.5})_m(R'SiO_{1.5})_n]_{\Sigma\#}$;

the functionalized homoleptic compositions are $[(RSiO_{1.5})_m(RXSiO_{1.5})_n]_{\Sigma\#}$;

the functionalized heteroleptic compositions are $[(RSiO_{1.5})_m(R'SiO_{1.5})_n(RXSiO_{1.0})_p]_{\Sigma\#}$ and wherein R and R' are independently selected from the group consisting of 1 to 40 carbon aliphatic, aromatic, olefinic or alkoxy groups;

m, n and p represent the stoichiometry of the formula composition and ranges from 0 to 100 inclusive;

Σ indicates that the composition forms a nanostructure; and refers to the number of silicon atoms contained within the nanostructure and is equal to the sum of m+n.

15. The composition of claim 1 wherein the at least one single-walled carbon nanotube is a one-atom-thick graphene sheet rolled in a tube more than 5 μm long.

16. The composition of claim 1 wherein the composition is applied to a floor.

17. The composition of claim 1, wherein the composition is formed by mixing the at least one polyepoxide with the at least one polyhedral silsesquioxane before mixing the at least one polyhedral silsesquioxane with the at least one amine hardener.

* * * * *